United States Patent [19]

Kränzler

[11] Patent Number: 4,649,308
[45] Date of Patent: Mar. 10, 1987

[54] ELECTRIC MOTOR TEMPLATE-WOUND COIL

[75] Inventor: Ernst Kränzler, Leinfelden-Echterdingen, Fed. Rep. of Germany

[73] Assignee: Robert Bosch GmbH, Stuttgart, Fed. Rep. of Germany

[21] Appl. No.: 726,221

[22] Filed: Apr. 22, 1985

[30] Foreign Application Priority Data

Jul. 20, 1984 [DE] Fed. Rep. of Germany ....... 3426706

[51] Int. Cl.$^4$ .............................................. H02K 3/48
[52] U.S. Cl. ...................... 310/214; 310/71; 310/194; 310/208; 242/7.13; 336/198
[58] Field of Search ............ 310/194, 71, 45, 43, 310/42, 91, 218, 260, 270, 269, 179, 180, 214, 198; 29/596, 598; 242/1 E, 7.13; 336/198, 208

[56] References Cited

U.S. PATENT DOCUMENTS

| 3,027,475 | 3/1962 | Gaudry | 310/214 |
|---|---|---|---|
| 3,443,136 | 5/1969 | Freeman | 310/194 |
| 3,609,427 | 9/1972 | Lautner | 310/194 |
| 3,866,847 | 2/1974 | Droll | 242/7.09 |
| 3,978,359 | 8/1976 | Kultzow | 310/45 |
| 4,114,056 | 9/1978 | Nimura | 310/194 |
| 4,182,026 | 1/1980 | Searle | 310/194 |
| 4,322,647 | 3/1982 | Neroda | 310/71 |

FOREIGN PATENT DOCUMENTS

| 0128705 | 12/1984 | European Pat. Off. | 310/208 |
|---|---|---|---|
| 2620532 | 11/1977 | Fed. Rep. of Germany | 310/269 |
| 0156134 | 9/1984 | Japan | 310/208 |
| 0047804 | 4/1978 | U.S.S.R. | 310/214 |

Primary Examiner—R. Skudy
Attorney, Agent, or Firm—Michael J. Striker

[57] ABSTRACT

A coil for an electric motor, which is to be inserted into a pole shoe and is wound, before the insertion, in a template, includes two cases of insulating material, which are positioned in mirror-inverted relationship with one another. Pockets are provided laterally of the cases to receive contact terminals therein. The pockets form limiting surfaces for limiting the insertion of the coil into a pole shoe. Each case is closed, after the coil winding has been completed, by connecting two upper portions thereof to each other by welding or glueing.

10 Claims, 7 Drawing Figures

U.S. Patent  Mar. 10, 1987  4,649,308
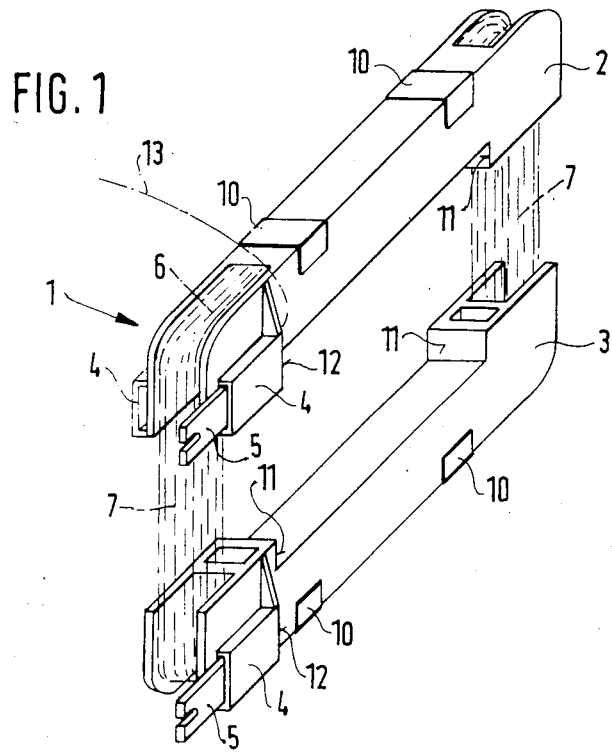
FIG. 1
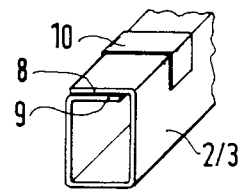
FIG. 2.1
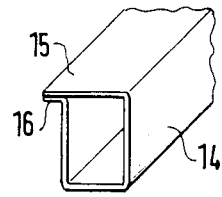
FIG. 2.2
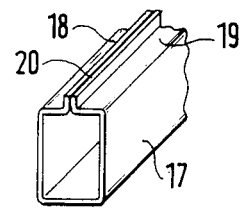
FIG. 2.3
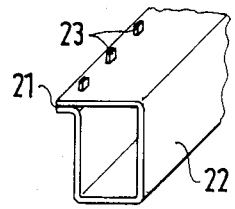
FIG. 2.4
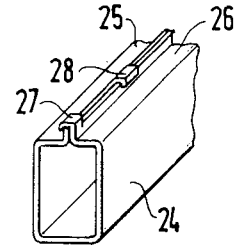
FIG. 2.5
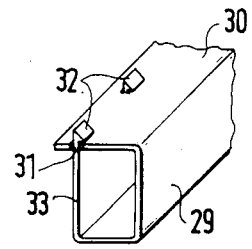
FIG. 2.6

ELECTRIC MOTOR TEMPLATE-WOUND COIL

BACKGROUND OF THE INVENTION

The present invention relates to a template-wound coil for an electric motor.

Coils for high-powered engines of the foregoing type are normally wound by means of a connecting tape and then surrounded by this tape and thereby insulated. The coil ends leading outwardly of the coil are, after the winding, connected to current-supply wires by soldering. This method of manufacturing of electric motor coils, is however extremely labor-consuming because it involves a great deal of manual operations.

SUMMARY OF THE INVENTION

It is an object of the present invention to provide an improved electric motor coil.

It is another object of the invention to provide a coil in which the case would include portions of insulating material and which could be automatically wound and inserted into a pole shoe.

These and other objects of the invention are attained by a coil for an electric motor and insertable into a pole shoe of the motor and comprising a winding which is wound in a template and two cases formed of an insulating material and positioned one opposite to the other, each of the cases being hollow and elongated and receiving therein in a direction of elongation turns of the winding.

The cases may be made of plastics and be arranged in mirror-invented relationship with one another.

The coil cases may be made of the same shape.

It is particularly advantageous for an automatic manufacturing of coils and for automatic connections of the coil end and start that the coil may include pockets formed on each of said cases for receiving contact terminals therein. These terminals may be either hook-like plugs or sockets.

Each of said cases has an end and a lateral side, said pockets may be provided laterally outwardly of each case at the end thereof so that each pocket forms a stop surface for limiting an insertion of the coil into the pole shoe.

Each case may have a cover wall closing the case to form therein a hollow, through which the turns of the winding extend.

Each of the cases may have at the cover wall thereof two overlapping portions which are connected to each other by a glueing tape or by ultraviolet welding.

The cover wall may have a portion extending laterally outwardly of the case and be provided with recesses, each case having a side wall formed with locking projections received in said recesses and locking the case in a closed position.

Each case has a side wall, said cover wall and said side wall may be formed with portions overlapping each other and connected to each other by through studs.

The cover wall may be formed with two portions extended upwardly from the case and overlapping each other, said portions being connected to each other by dovetailing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a template-wound coil according to the invention; and FIGS. 2.1 through 2.6 illustrate partially perspective views of various embodiments of the coil half-case, made of synthetic plastic material.

DETAILED DESCRIPTION OF THE PREFERRED EMBODIMENTS

Referring now to the drawings in detail, FIG. 1 illustrates a perspective view of the coil generally designated by reference numeral 1. Coil 1, which is to be wound or wrapped in accordance with a template, includes two hollow, box-like cases 2 and 3 which are mirror-inverted relative to each other and both made of synthetic plastic material. Each of these cases includes a shaped pocket or pouch 4, also of plastics. The mirror-inverted structure passes through pockets 4. Plastic cases or boxes 2 and 3 can be formed of the same shape. This is illustrated by dashed-dotted line showing pocket 4 on the upper plastic case 2.

Contact terminals 5 are inserted in pockets 4 of two opposing plastic cases 2 and 3. These terminals are in contact with the starting and terminating ends of the coil. A current supply lead can be connected to each contact terminal. A coil winding 6 is inserted into the oppositely-positioned plastic cases 2 and 3 during the wrapping of the coil by means of a non-illustrated template. Winding turns pass through the elongated cases 2 and 3. Coil portions 7, non-engaged within cases 2 and 3, are protected in the conventional manner by tapes or drip resin. Plastics caps with through openings, covered with resin, can be also utilized to protect the coil turns.

FIGS. 2, 1 through 2.6 show various manners of the formation and connection of the box-like case 2 or 3. Case 2 or 3 is closed after the winding of the coil in a template has been completed. As shown in FIG. 2.1 the case 2 or 3 has two deformed cover portions or walls 8 and 9 which overlap each other thus forming a hollow and are connected to each other to close the box-like case 2 or 3 by means of a glueing tape 10.

Abutment surfaces 11 of case 2 or 3, shown in FIG. 1 ensure the insertion of an iron core (not shown) in a proper position and also serve for a required insulating distance. Backside limiting surfaces 12 of the pockets 4 limit an insertion movement of coil 1 into a pole shoe schematically and partially shown by dash-dotted line 13

In the embodiment of FIG. 2.2 case 14 is formed with a cover portion 15 which has a greater width than that of the bottom wall of case 14. An overlapping portion of the cover 5 corresponds to a bent-over portion or tongue 16 provided on the side wall of case 14. The overlapping edge of the cover portion 15 forms together with the tongue 16 a double lip, by means of which portion 15 and tongue 16 can by connected to each other by ultraviolet welding or glued to each other.

FIG. 2.3 illustrates a further embodiment in which welding or glueing can be utilized. The box-like case 17 is formed in this embodiment with two cover projections or portions 18 and 19. The upwardly projecting edges 18, 19 of the two halves of the cover portion form a double lip 20 to which welding or glueing is applied to close case 17.

In the modification illustrated in FIG. 2.4 case 22 is formed with a double lip 21 which can be interconnected by means of studs 23 extending through respective recesses formed in the double lip 21.

In the embodiment of FIG. 2.5 upwardly extending projections are formed on the two halves 25, 26 of the cover portion of the case 24 similarly to the embodiment of FIG. 2.3. The upwardly extending edges are bent over to form projections or noses 27 and 28 which are interengaged with each other by dovetailing.

Finally, in the embodiment of FIG. 2.6 a cover portion 30 of case 29 extends laterally beyond the remaining part of the case. Cover portion 30 has perforations 31 into which arresting projections or noses 32, formed on the vertical wall of the case, are engaged and wherein these projections are locked.

Cases 2 and 3, before winding of the coil 1, are inserted into the template in the known fashion and then winding of the coil is performed. Cases 2 and 3 are enclosed in the manner shown in FIGS. 2.1 through 2.6 after the coil winding in the template has been ended. The coil 1 produced in the above described fashion and shown in FIG. 1 is very stable and can be automatically inserted into a pole shoe of the electric motor. Pockets 4 laterally formed on the respective cases can readily receive connection terminals 5. The coil end and start can be automatically connected to terminals 5, without loosening the winding tension. The surfaces of pockets 4 provide reliable stops for the insertion of the coil into the pole shoe 13.

It will be understood that each of the elements described above, or two or more together, may also find a useful application in other types of template-wound coils differing from the types described above.

While the invention has been illustrated and described as embodied in a template-wound coil, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A template-wound coil for an electric motor and insertable into a pole shoe of the electric motor and comprising a winding having a plurality of turns; and two hollow box-like cases of insulating material positioned opposite to each other, said turns of the winding having opposing elongated portions inserted into and closed by said cases, said cases having pockets formed thereon for receiving contact terminals of the coil.

2. The coil as defined in claim 1, wherein each of said pockets is formed at an end of each of said cases and extends laterally of and outwardly therefrom, each of said pockets having a stop surface (12) which serves as a stop for limiting the insertion of the coil into the pole shoe.

3. The coil as defined in claim 1, wherein each of said cases has at least one cover wall closing each of said cases to form therein a hollow, through which the elongated portions of the turns of the winding extend.

4. The coil as defined in claim 3, wherein each of said cases has at the cover wall thereof two overlapping portions which are connected to each other by a glueing tape.

5. The coil as defined in claim 3, wherein each of said cases has at the cover wall thereof two overlapping portions which are connected to each other by ultraviolet welding.

6. The coil as defined in claim 3, wherein said cover wall has a portion extending laterally outwardly of each of said cases and provided with recesses, each of said cases having a side wall formed with locking projections received in said recesses and locking each of said cases in a closed position.

7. The coil as defined in claim 3, wherein each of said cases has a side wall, said cover wall and said side wall being formed with portions overlapping each other and connected to each other by through studs.

8. The coil as defined in claim 3, wherein said cover wall is formed with two portions extended upwardly from the case and overlapping each other, said portions being connected to each other by dovetailing.

9. The coil as defined in claim 1, wherein each of said cases are made of plastic and are arranged in mirror-inverted relationship with one another.

10. The coil as defined in claim 1, wherein each of said cases are made of plastic and are of the same shape.

* * * * *